(12) United States Patent
Robinson et al.

(10) Patent No.: US 6,298,886 B1
(45) Date of Patent: Oct. 9, 2001

(54) DISPENSING TOOL ASSEMBLY FOR EVACUATING AND CHARGING A FLUID SYSTEM

(75) Inventors: Randy S. Robinson, Bradford; Randy S. Stemen, Lebanon, both of OH (US)

(73) Assignee: Production Control Units, Inc., Dayton, OH (US)

( * ) Notice: Subject to any disclaimer, the term of this patent is extended or adjusted under 35 U.S.C. 154(b) by 0 days.

(21) Appl. No.: 09/610,025

(22) Filed: Jul. 5, 2000

(51) Int. Cl.$^7$ .................................................. B65B 3/04
(52) U.S. Cl. ........................... 141/385; 141/18; 141/59; 141/383; 222/3; 62/292; 137/614.06; 251/149.6
(58) Field of Search ................................. 141/3, 18, 21, 141/59, 65, 383, 385; 222/3, 4; 62/292; 251/149.6; 137/614.06

(56) References Cited

U.S. PATENT DOCUMENTS

| Re. 34,426 | 11/1993 | Weaver et al. ........................ 62/292 |
| Re. 34,715 | 9/1994 | Gudenau et al. ..................... 141/59 |
| 1,744,287 | * 1/1930 | Tibbets ................................... 62/292 |
| 2,165,342 | * 7/1939 | Campbell, Jr. .......................... 222/3 |
| 2,887,124 | * 5/1959 | Mehl ............................... 137/614.06 |
| 3,759,291 | * 9/1973 | Moore et al. ......................... 62/292 |
| 4,586,634 | * 5/1986 | Minter et al. ............................ 222/3 |
| 4,889,149 | 12/1989 | Weaver et al. ............................ 137/1 |
| 5,088,436 | * 2/1992 | Stritmatter ............................. 141/18 |

* cited by examiner

Primary Examiner—J. Casimer Jacyna
(74) Attorney, Agent, or Firm—Jacox, Meckstroth & Jenkins

(57) ABSTRACT

A refrigerant dispensing tool includes a three section body with a top manifold section having an evacuation port, a refrigerant supply port and an oil supply port. The intermediate body section has three elongated and converging valve chambers which connect with the corresponding ports and receive corresponding elongated fluid pressure balancing valve members. The valve members are independently operated and precisely controlled by corresponding air actuated pistons which receive pressurized air from corresponding air ports within the manifold section. An air actuated and spring biased annular piston is supported between the intermediate and base sections of the body and operates a set of circumferentially spaced balls which releasably clamp the tool to a stem valve fitting for a refrigerant system. An air actuated pin extends on the center axis of the body for opening and closing the valve stem within the fitting, and a resilient sealing ring forms a fluid-tight seal between the base section and the fitting.

20 Claims, 3 Drawing Sheets

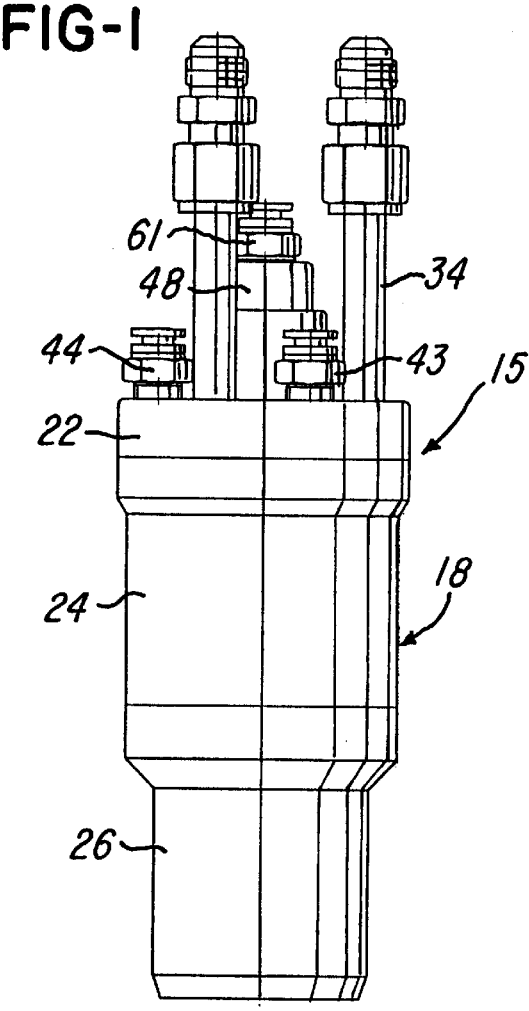
FIG-1
FIG-2
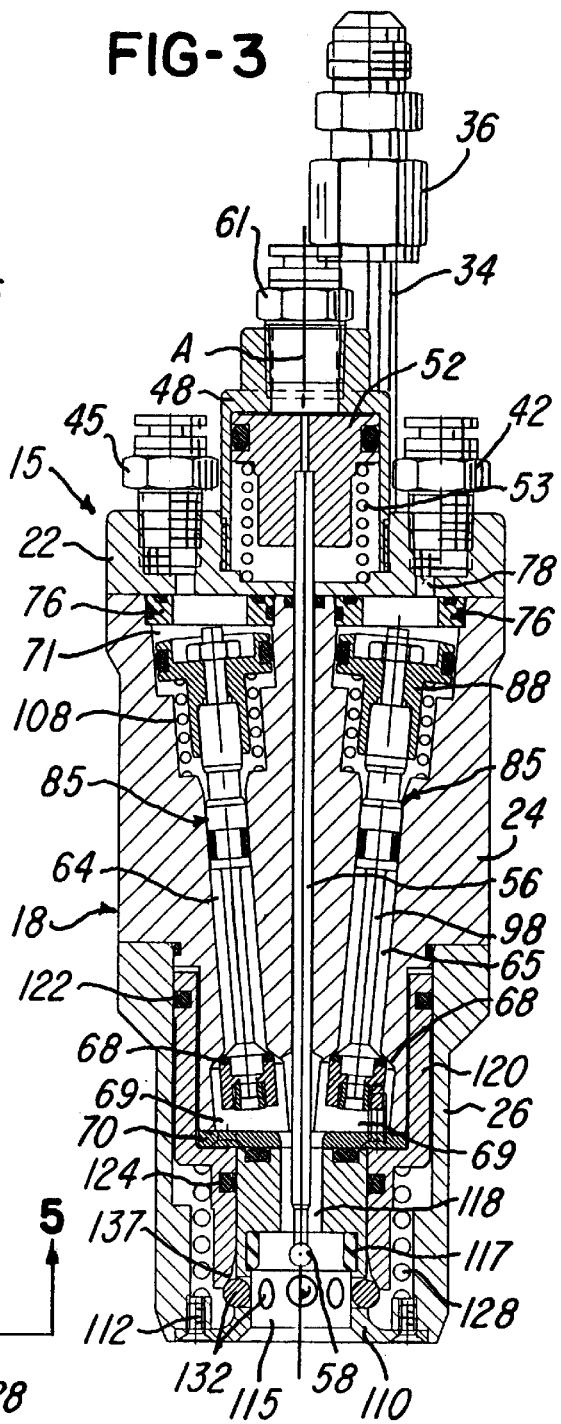
FIG-3

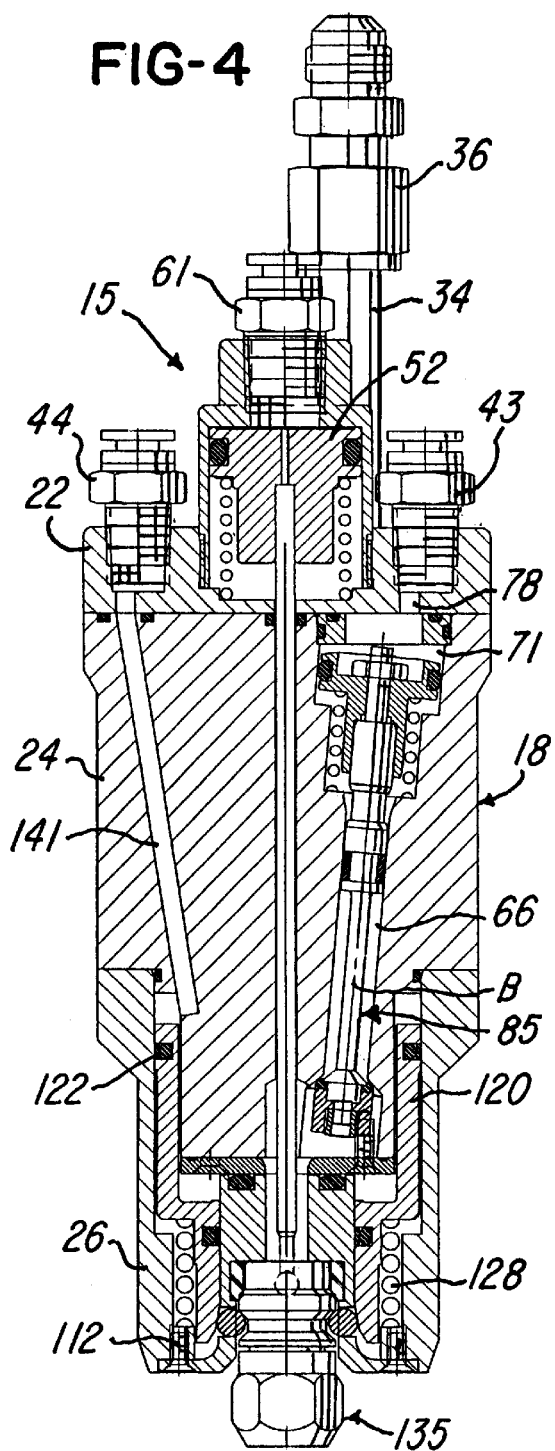
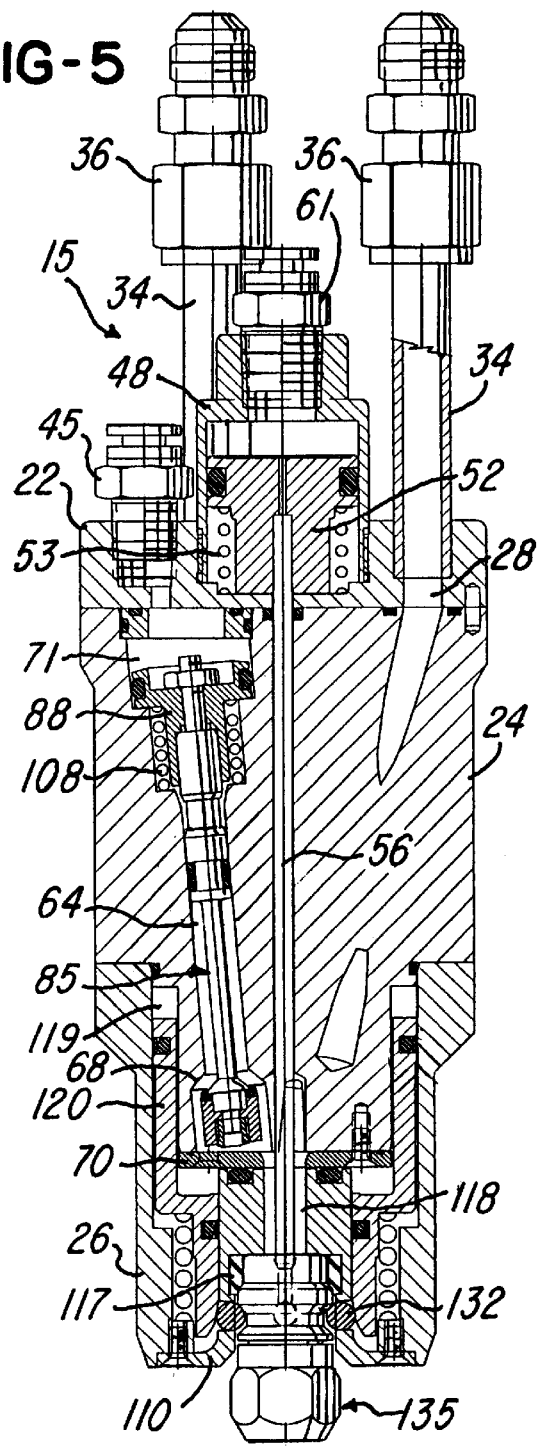

US 6,298,886 B1

DISPENSING TOOL ASSEMBLY FOR EVACUATING AND CHARGING A FLUID SYSTEM

BACKGROUND OF THE INVENTION

The present invention relates to fluid dispensing tool assemblies for evacuating and charging a fluid into a fluid system and of the general type disclosed in U.S. Pat. No. RE34,715 and in U.S. Pat. Nos. RE 34,426 and 4,889,149 which issued to the assignee of the present invention. As disclosed in the '426 and '149 patents, such tool assemblies are commonly used to fill motor vehicle air conditioning and other air conditioning and refrigeration or refrigerant systems by first evacuating the system and then charging or filling the system with a predetermined volume of liquid refrigerant in addition a predetermined volume of lubricating oil for the compressor. Since all of the air in the system is removed during the evacuation cycle, the refrigerant system is filled completely without residual air pockets.

With any such dispensing tool assembly for evacuating and filling a refrigerant system, it is desirable for the tool assembly to be compact and lightweight for convenient maneuvering into small spaces, to be easily and quickly coupled to the refrigerant system, and to be simple in construction with the minimum number of parts. It is also desirable for the tool assembly to have control valves and passages which do not restrict the flow of fluid through the tool assembly during evacuation and filling so that a high fill rate and a short cycle time may be obtained. In addition, the tool assembly should minimize the release of refrigerant into the atmosphere when the tool assembly is removed from the refrigerant system, and have control valves which can be rapidly and pneumatically actuated to provide precision charging and precision repeatability in addition to obtaining a minimum cycle time. While the charging or dispensing tool assemblies disclosed in the above mentioned patents provide some of these desirable features, none of the tool assemblies provide all of the features.

SUMMARY OF THE INVENTION

The present invention is directed to an improved fluid dispensing tool assembly which provides all of the desirable features and advantages mentioned above and which is especially compact, simple and lightweight in construction while providing for unrestricted flow and precision operation during the evacuation and fluid charging operations so that the cycle time may be minimized and precise volumes of refrigerant and oil are dispensed into the system.

In accordance with a preferred embodiment of dispensing tool constructed in accordance with the invention, the above advantages are provided by a tool body including an upper manifold head section, an intermediate valve body section and a lower base section which are secured together and have a common center axis. The upper manifold section is provided with an evacuation port, a fluid refrigerant supply port, and an oil supply port, and the ports are connected to a charging machine by corresponding flexible lines. The intermediate body section defines three elongated valve chambers which converge downwardly towards the center axis to a small bottom chamber and are connected to the corresponding ports within the manifold section by internal passages. Each of the inclined valve chambers supports an elongated pressure balanced valve member which is shifted axially by an air actuated piston within the upper portion of the valve chamber for opening and closing a closure member within the lower portion of the valve chamber adjacent the center axis. The three air actuated pistons are connected to corresponding pressurized air control ports within the top manifold head section, and the air control ports are connected to the charging machine by flexible pressurized air control lines.

The base section of the tool body supports an annular base collar which carries a resilient sealing ring and circumferentially spaced locking balls for coupling and sealing the tool assembly to a Schrader-type fitting of a refrigerant system and having a pressure responsive stem valve. An actuating pin extends on the center axis of the assembled body sections and is shifted axially by an air operated piston within a cylinder threaded into the head section for opening and closing the pressure responsive stem valve within the fitting of the refrigerant system. A stepped-shaped annular piston is confined within an annular chamber defined between the intermediate and base sections of the tool body for moving the coupling balls radially inwardly in response to air pressure received through a passage connected to a clamping air port within the head section.

Other features and advantages of the invention will be apparent from the following description, the accompanying drawings and the appended claims.

BRIEF DESCRIPTION OF THE DRAWINGS

FIG. 1 is a side elevational view of a dispensing tool assembly constructed in accordance with the invention;

FIG. 2 is a top plan view of the tool assembly shown in FIG. 1;

FIGS. 3–6 are sections taken generally on the lines 3—3, 4—4, 5—5, and 6—6 of FIG. 2.

DESCRIPTION OF THE PREFERRED EMBODIMENT

Figure 6:
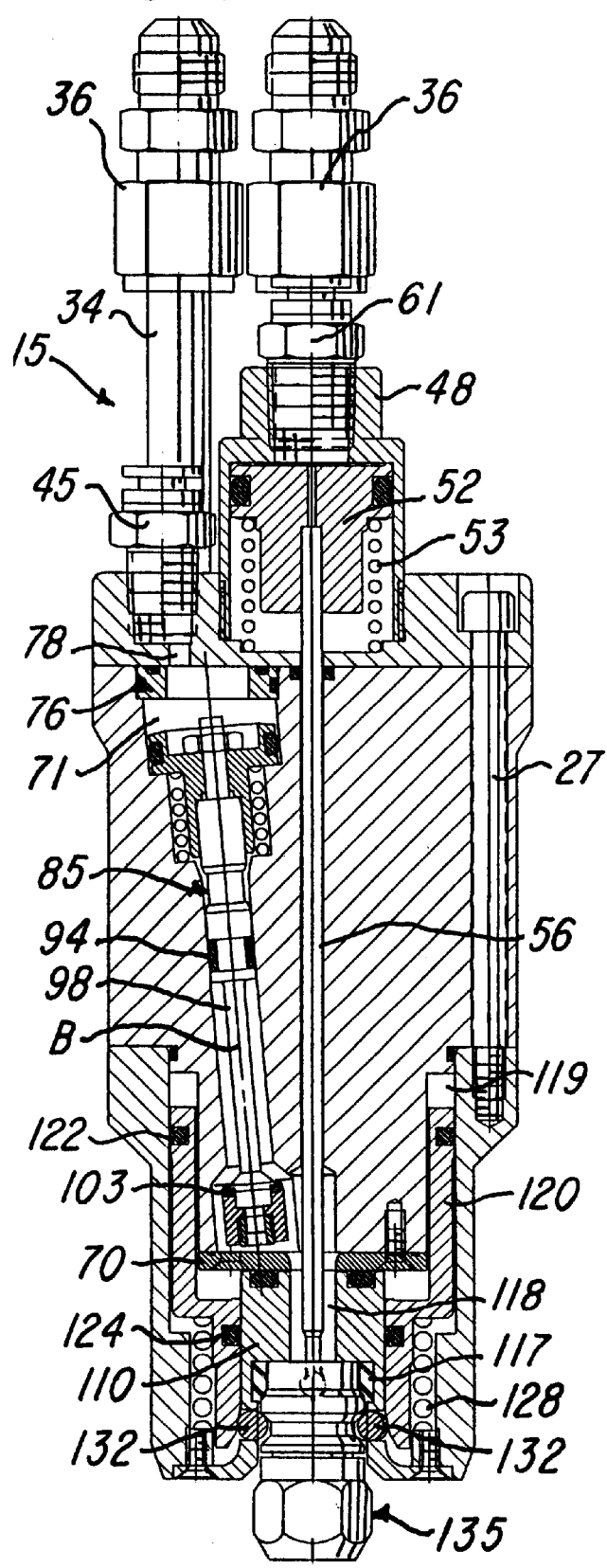

FIG. 1 illustrates a dispensing tool assembly 15 which includes a hard coated aluminum body 18 having an upper manifold or head section 22, an intermediate section 24 and a bottom or base section 26, all secured together by three screws 27 (FIG. 6). The head section 22 has a fluid refrigerant supply port 28 (FIG. 5), a similar evacuation port 31 and an oil supply port 32 (FIG. 2), and the ports connect with corresponding tubes 34 and fittings 36 which project upwardly from the head section 22 parallel to a center axis A of the tube body 18. The manifold or head section 22 of the body 18 also supports a set of four tubular fittings 42–45 (FIG. 2) which receive and clamp onto corresponding flexible pressurized air control lines. The fitting 42 receives the air line for controlling the supply of refrigerant the fitting 43 receives air for controlling the supply of oil, the fitting 44 receives air for controlling the clamping or coupling of the tool assembly, as will be explained later, and the fitting 45 receives air which controls the evacuation of the refrigerant system before it is charged with liquid refrigerant and lubricating oil.

An air actuated cylinder 48 (FIGS. 2 & 3) is threaded into a center bore within the head section 22 and encloses a piston 52 which is biased upwardly within the cylinder 48 by a compression spring 53. The piston 52 is connected to the upper end portion of an actuating pin 56 which extends downwardly on the center axis A of the tool assembly 15 and supports a spherical or ball-like lower tip 58. A fitting 61 is threaded into the upper end portion of the cylinder 48 and releasably clamps onto a flexible pressurized air control line (not shown) for actuating or moving the piston 52 and the actuating pin 56 axially against the spring 53 when pressurized air is received within the fitting 61.

Referring to FIGS. 3–6, the intermediate section 24 of the tool body 18 defines three elongated valve chambers 64 and 65 (FIG. 3), and 66 (FIG. 4) which are uniformly spaced around the axis A and converge inwardly towards the axis A as the valve chambers extend downwardly within the body. Frusto-conical valve seats 68 are located within enlarged lower end portions 69 of the valve chambers, and the chamber portions 69 are partially closed by an annular plate 70 secured to the body section 24. Each of the valve chambers 64–66 has an enlarged portion 71 adjacent the upper end of the intermediate body section 24, and the upper end portion 71 of each valve chamber 64–66 has a slight counterbore which receives a retainer ring 76. Each ring 76 carries a set of resilient O-ring seals which form fluid-tight seals with the head section 22 and the intermediate section 24 of the body 18. A port or passage 78 connects the top of each valve chamber 64–66 with its corresponding actuating air fitting 42–45.

Figure 7:
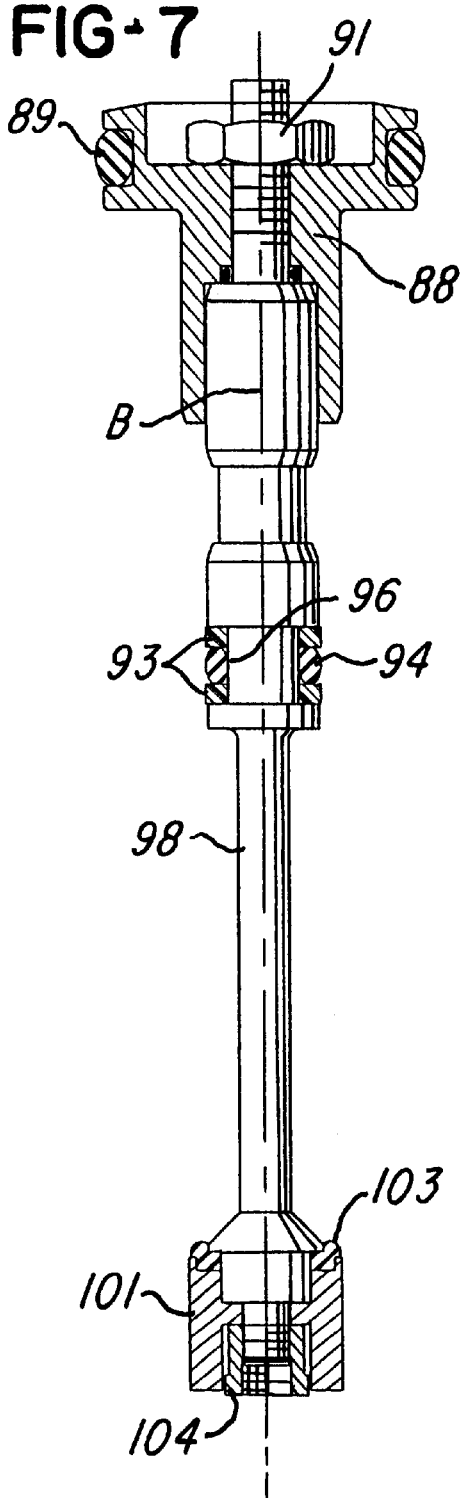
FIG. 7 is an enlarged view in part section of one of the three elongated pressure balanced valve members shown in FIGS, 3–6.

An elongated valve member 85 (FIG. 7)extends within each of the three valve chambers 64, 65 and 66, and each valve member 85 has an axis B which converges with and intersects the center axis A of the tool assembly 15. The upper end portion of each valve member 85 includes a piston 88 which is received within the corresponding cylindrical chamber portion 71 and which carries a resilient annular seal 89. A threaded nut 91 retains each piston 88, and a set of resilient back-up rings 93 and 94 are confined within a groove 96 within each valve member to form a sliding fluid-tight seal between the valve member 85 and the body section 24. Each valve member 85 also has an elongated stem portion 98 of reduced diameter, and the lower end portion of each valve member supports an annular closure element or member 101 having an annular cavity which receives a resilient sealing ring 103. A tubular nut 104 retains the closure member 101, and a compression spring 108 (FIGS. 3–6) is confined within each valve chamber 64–66 and normally urges the corresponding piston 88 and valve member upwardly to its closed position where the sealing ring 103 engages the corresponding valve seat 68.

The base section 26 (FIGS. 3–6) of the tool body 18 supports an annular base collar 110 having an outwardly projecting flange secured by a set of peripherally spaced screws 112 to the base section 26. The collar 110 defines a generally cylindrical cavity or chamber 115 (FIG. 3) which retains a resilient sealing ring 117 and has a center passage 118 connecting the chamber 115 to the three lower end portions 69 of the valve chambers 64–66. The base section 26 of the valve body 18 also cooperates with the lower portion of the intermediate body section 24 to define an annular chamber 119 which receives an annular piston 120 supported for axial movement within the chamber. A resilient sealing ring 122 forms a fluid-tight sliding seal between the upper end portion of the piston 120 and the body section 26, and a smaller diameter resilient sealing ring 124 forms a fluid-tight seal between a lower end portion of the piston 120 and the base collar 110. A compression spring 128 normally urges the piston 120 upwardly to its normal position (FIG. 3).

The base collar 110 has a series of eight circumferentially spaced holes which receive a corresponding series of balls 132 shown in their retracted position in FIG. 3. The chamber 115 within the base collar 110 is adapted to receive a conventional Schrader-type pressure valve fitting 135 (FIGS. 4–6) of a refrigerant system (not shown) when it is desired to evacuate the system and charge the system with a predetermined supply with refrigerant and a predetermined supply of lubricating oil.

As shown in FIGS. 3–6, the lower end portion of the piston 120 has a tapered inner annular cam surface 137 positioned to engage the circumferentially spaced balls 132. When it is desired to couple the tool assembly 15 to a valve fitting 135, the tool assembly 15 is moved until the upward end portion of the fitting 135 is firmly received within the sealing ring 117. Pressurized air is then introduced to the fitting 44, and the pressurized air is directed from the fitting by a passage 141 (FIG. 4) to the upper end of the piston chamber 119. The pressurized air forces the piston 120 downwardly so that the tapered surface 137 on the piston cams the balls 132 inwardly for locking the tool assembly 15 onto the valve fitting 135. Pressurized air is then supplied to the fitting 61 to urge the piston 52 and actuating pin 56 downwardly against the bias of the spring 53 so that the tip 58 presses the valve stem (not shown) within the fitting 135 downwardly to its open position. As shown in FIG. 5, the refrigerant supply port 28 and the corresponding evacuation port 31 and oil supply port 32 are connected by internal passages within the intermediate body section 24 to their corresponding valve chamber 64–66 around the stems 98 and between the corresponding set of seals 93 and 94 and the annular valve seal 103. These passages cooperate with the valve chamber 64–66 and corresponding chamber portions 69 to provide an unrestricted smooth flow of the refrigerant and oil during the charging portion of the cycle.

After the stem valve within the valve fitting 135 is opened by downward movement of the pin 56, pressurized air is supplied to the evacuation control port 45 which forces the corresponding valve member 85 downwardly within the corresponding chamber 64 to an open position so that the suction within the evacuation port 31 evacuates the refrigerant system through the center chamber 118 and the valve chamber 64. After all of the air is substantially evacuated from the system, the air pressure at the port 45 is released so that the corresponding spring 108 returns the valve member 85 within the valve chamber to its closed position. Pressurized air is then introduced in timed relation through the fittings 42 and 43 causing the valve members 85 within the refrigerant chamber 64 and the valve member 85 within the oil valve chamber 66 to open for predetermined time periods to supply predetermined volumes of refrigerant and oil to the refrigerant system.

After the refrigerant system is fully charged with the desired volume of refrigerant and oil, the actuating air pressure to each of the pistons 88 on the valve members within the corresponding valve chambers 65 & 66 is released so that the valve members 85 return to their normally closed positions by the corresponding springs 108. The pressurized air to the fitting 44 is then released so that the clamping piston 120 moves upwardly by the spring 128 to its upper position (FIG. 3) allowing the balls 132 to shift outwardly to their retraced and released positions. The tool assembly 15 may then be lifted or removed from the fitting 135, and the cycle is completed.

From the drawings and the above description, it is apparent that a dispensing tool assembly constructed in accordance with the present invention, provides all of the advantages mentioned above. More specifically, the assembly is compact and has a low weight, and the valve chambers 64–66 and corresponding valve members 85 provide for a high flow rate for evacuation and for the refrigerant and oil flow through the tool assembly. The individually controlled and air actuated pistons 88 and the balance fluid pressure on each of the valve members 85 provide for rapid and precision valve operation with relatively small pistons 88 and light springs 108 for normally closing the valve members 85. That is, the sealing diameter of the annular seal 103 on each valve member 85 is substantially the same diameter as the annular seals 93 and 94 so that the upward and downward fluid pressure forces on each valve member 85 by the refrigerant or oil are substantially balanced.

The converging relation of the valve chamber 64–66 and corresponding valve members 85 also permits using relatively small corresponding closure members 101 so that the combined volume of the three chamber portions 69 and the center chamber 118 is minimized. This provides for minimizing the volume of refrigerant that escapes into the atmosphere when the tool assembly 15 is removed from a valve fitting 135 after a cycle is completed. Since the operation of each of the valve members 85 is precisely and quickly controlled by the corresponding air actuated piston 88, the tool assembly 15 provides for precision charging of refrigerant and oil into a refrigerant system, as well as more accurate repeatability with a minimized cycle time.

While the form of dispensing tool herein described constitutes a preferred embodiment of the invention, it is to be understood that the invention is not limited to this precise form of tool, and that changes may be made therein without departing from the scope and spirit of the invention as defined in the appended claims.

What is claimed is:

1. A dispensing tool assembly adapted to be releasably connected to a refrigerant system having a pressure responsive inlet valve and for first evacuating the system and then filling the system with a refrigeration fluid, said tool assembly comprising a body defining an evacuation port adapted to be connected to a suction line and a fluid inlet port adapted to be connected to a source of the fluid, said body having an opening with a resilient sealing ring for receiving and sealing with the inlet valve, a fluid actuating coupling mechanism for releasably securing said body to said inlet valve, said body having a plurality of elongated inclined valve chambers circumferentially spaced around a center axis of said tool body and converging towards said axis and said opening, an elongated valve member within each of said valve chambers and having a lower end portion with a closure member for said chamber, each of said valve members connected to a corresponding fluid actuated piston, and said body having corresponding pressurized fluid receiving ports connected to said fluid actuated pistons.

2. A tool assembly as defined in claim 1 wherein each of said elongated valve members comprises a valve stem having a lower end portion supporting said closure member and an upper end portion supporting one of said actuating pistons, and a fluid balancing sealing ring mounted on an intermediate portion of said valve stem and having a diameter generally the same as said closure member.

3. A tool assembly as defined in claim 1 wherein said body includes an upper manifold section, an intermediate section and a lower base section having a collar member defining said opening for receiving the fitting, said elongated converging valve chambers are disposed within said intermediate section, and said evacuation port, said fluid inlet port and said fluid operating ports are disposed within said upper manifold section.

4. A tool assembly as defined in claim 3 wherein said intermediate section and a surrounding annular portion of said base section define therebetween a fluid chamber, and said coupling mechanism includes an annular piston within said chamber and surrounding said lower end portions of said valve members.

5. A tool assembly as defined in claim 1 wherein said body includes a tubular base collar defining said opening for receiving the inlet fitting and supporting said sealing ring, said collar defining a center passage extending from said opening and connected to said valve chambers, said coupling mechanism including a plurality of circumferentially spaced locking elements supported for generally radial movement by said base collar, and a fluid actuated annular piston supported for movement by said body and having an annular cam surface for moving said locking elements.

6. A tool assembly as defined in claim 1 and comprising three of said converging valve chambers each receiving a corresponding said elongated valve member.

7. A tool assembly as defined in claim 1 and including a fluid actuated pin extending on the center axis of said tool body for opening the inlet valve of the fitting, and said converging valve chambers and valve members having axes substantially intersecting said center axis.

8. A tool assembly as defined in claim 1 and including an annular plate closing the lower ends of said valve chambers and having a center port aligned with said opening and said sealing ring.

9. A tool assembly as defined in claim 1 wherein each of said valve chambers has an enlarged lower portion with an annular valve seat receiving the corresponding said closure member and an enlarged upper portion receiving the corresponding said piston.

10. A tool assembly as defined in claim 9 wherein said enlarged upper portion of each said valve chambers receives a compression spring biasing the corresponding said valve member to a closed position with said closure member engaging said valve seat.

11. A dispensing tool assembly adapted to be releasably connected to a refrigerant system having a pressure responsive inlet valve and for first evacuating the system and then filling the system with a refrigeration fluid and a supply of oil, said tool assembly comprising a body including an upper manifold section defining an evacuation port adapted to be connected to a suction line, a refrigerant inlet port adapted to be connected to a source of refrigerant and an oil inlet port adapted to be connected to a supply of oil, said body including a lower base section having an opening with a resilient sealing ring for receiving and sealing with the inlet valve, a fluid actuating coupling mechanism for releasably securing said base section of said body to said inlet valve, said body having at least three elongated inclined valve chambers circumferentially spaced around a center axis of said tool body and converging towards said axis and said opening, an elongated valve member within each of said valve chambers and having a lower end portion with a closure member for said chamber, each of said valve members connected to a corresponding fluid actuated piston, and said upper section of said body having corresponding pressurized fluid receiving ports connected to said fluid actuated pistons.

12. A tool assembly as defined in claim 11 and including a fluid actuated pin extending on the center axis of said tool body for opening the inlet valve of the fitting, and said converging valve chambers and said valve members having axes substantially intersecting said center axis.

13. A tool assembly as defined in claim 11 wherein said body includes an intermediate section between said manifold section and said base section, said elongated converging valve chambers extending within said intermediate section, and said evacuation port, said fluid inlet port, said oil inlet port and said fluid operating ports extend through a top surface of said manifold section.

14. A tool assembly as defined in claim 13 wherein said intermediate section and a surrounding annular portion of said base section define therebetween a fluid chamber, and said coupling mechanism includes an annular piston within said chamber and surrounding said lower end portions of said valve members.

15. A tool assembly as defined in claim 11 wherein said body includes a tubular base collar defining said opening for receiving the inlet fitting and supporting said sealing ring, said collar defining a center passage extending from said opening and connected to said valve chambers, said coupling mechanism including a plurality of circumferentially spaced locking elements supported for generally radial movement by said base collar, and a fluid actuated annular piston supported for movement by said body and having an annular cam surface for moving said locking elements.

16. A tool assembly as defined in claim 11 wherein each of said elongated valve members comprises a valve stem having a lower end portion supporting said closure member and an upper end portion supporting one of said actuating pistons, and a fluid balancing sealing ring mounted on an intermediate portion of said valve stem and having a diameter generally the same as said closure member.

17. A tool assembly as defined in claim 11 and including an annular plate closing the lower ends of said valve chambers and having a center port aligned with said opening and said sealing ring.

18. A tool assembly as defined in claim 11 wherein each of said valve chambers has an enlarged lower portion with an annular valve seat receiving the corresponding said closure member and an enlarged upper portion receiving the corresponding said piston.

19. A tool assembly as defined in claim 18 wherein said enlarged upper portion of each said valve chambers receives a compression spring biasing the corresponding said valve member to a closed position with said closure member engaging said valve seat.

20. A dispensing tool assembly adapted to be releasably connected to a refrigerant system having a pressure responsive inlet valve and for first evacuating the system and then filling the system with a refrigeration fluid, said tool assembly comprising a body defining an evacuation port adapted to be connected to a suction line and a fluid inlet port adapted to be connected to a source of the fluid, said body having an opening with a resilient sealing ring for receiving and sealing with the inlet valve, a fluid actuating coupling mechanism for releasably securing said body to said inlet valve, said body having a plurality of elongated valve chambers circumferentially spaced around a center axis of said tool body, an elongated valve member within each of said valve chambers and having a lower end portion with a closure member for said chamber, each of said valve members having an upper end portion connected to a corresponding fluid actuated piston, said body having corresponding pressurized fluid receiving ports connected to said fluid actuated pistons, and a fluid pressure balancing sealing ring mounted on each said valve member and having a diameter generally the same as said closure member.

* * * * *